(12) United States Patent
Oh et al.

(10) Patent No.: US 10,897,525 B2
(45) Date of Patent: Jan. 19, 2021

(54) TRANSMISSION APPARATUS, CELL MULTIPLEXING METHOD THEREOF, RECEPTION APPARATUS, AND CELL DE-MULTIPLEXING METHOD THEREOF

(71) Applicant: SAMSUNG ELECTRONICS CO., LTD., Suwon-si (KR)

(72) Inventors: Young-ho Oh, Suwon-si (KR); Hak-ju Lee, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/479,280

(22) PCT Filed: Jan. 29, 2018

(86) PCT No.: PCT/KR2018/001251
§ 371 (c)(1),
(2) Date: Jul. 19, 2019

(87) PCT Pub. No.: WO2018/143633
PCT Pub. Date: Aug. 9, 2018

(65) Prior Publication Data
US 2019/0379771 A1 Dec. 12, 2019

(30) Foreign Application Priority Data
Feb. 3, 2017 (KR) .................. 10-2017-0015712

(51) Int. Cl.
*H04L 29/08* (2006.01)
*H04L 27/26* (2006.01)
(52) U.S. Cl.
CPC ........ *H04L 69/324* (2013.01); *H04L 27/2614* (2013.01)

(58) Field of Classification Search
CPC ....... H04L 69/324; H04L 69/18; H04L 69/22; H04L 69/165; H04L 27/14; H04L 27/17
See application file for complete search history.

(56) References Cited

U.S. PATENT DOCUMENTS 8,923,150 B2 12/2014 Mourad et al.
8,964,682 B2 2/2015 Mourad et al.
(Continued)

FOREIGN PATENT DOCUMENTS

EP 2541917 A2 1/2013
KR 10-2012-0115152 A1 10/2012
(Continued)

OTHER PUBLICATIONS

"ATSC Standard: Physical Layer Protocol", Advanced Television Systems Committee, Doc. A/322:2016, Sep. 7, 2016, Total 259 pages.
(Continued)

*Primary Examiner* — Candal Elpenord
(74) *Attorney, Agent, or Firm* — Sughrue Mion, PLLC

(57) ABSTRACT

A transmission apparatus is disclosed. The present transmission apparatus, for each PLP, comprises: a frame builder which calculates the size of a subslice based on the number of cells of the PLP to be transmitted in one subframe and the number of predetermined subslices, compares a value calculated based on the size of the subslices and the number of the subslices with the number of cells of the PLP to determine whether to insert the dummy cell, and maps a cell of the PLP included in the subslice to a subframe; and a transmission unit for transmitting the subframe to a reception apparatus, and at least one of the subslices may comprise a dummy cell depending on whether the dummy cell is inserted.

15 Claims, 23 Drawing Sheets

(56) References Cited

U.S. PATENT DOCUMENTS

| | | |
|---|---|---|
| 9,066,333 B2 | 6/2015 | Mourad et al. |
| 9,363,060 B2 | 6/2016 | Mourad et al. |
| 9,413,508 B2 | 8/2016 | Mourad et al. |
| 2012/0327955 A1* | 12/2012 | Herrmann .......... H04N 21/2389 370/476 |
| 2013/0265956 A1 | 10/2013 | Mourad et al. |
| 2015/0033279 A1 | 1/2015 | Yun et al. |
| 2015/0049711 A1* | 2/2015 | Hwang ................ H04L 5/0053 370/329 |
| 2016/0173233 A1* | 6/2016 | Loghin .................. H04L 27/14 375/295 |
| 2016/0302201 A1 | 10/2016 | Earnshaw et al. |
| 2017/0180809 A1 | 6/2017 | An et al. |
| 2017/0290007 A1* | 10/2017 | Park ...................... H04L 1/0043 |
| 2017/0294987 A1 | 10/2017 | Kwon et al. |

FOREIGN PATENT DOCUMENTS

| | | |
|---|---|---|
| KR | 10-2013-0126468 A | 11/2013 |
| KR | 10-2016-0108379 A | 9/2016 |
| WO | 2016159579 A1 | 10/2016 |

OTHER PUBLICATIONS

Oh, et al. "A Design of Multiplexing Systems based on M-PLP for the Next Generation Terrestrial 4K UHD & HD Convergence broadcasting", KETI, Jun. 2016, Total 3 pages including English Abstract.

International Search Report dated May 11, 2018, issued by the International Searching Authority in International Application No. PCT/KR2018/001251 (PCT/ISA/210).

Written Opinion dated May 11, 2018, issued by the International Searching Authority in International Application No. PCT/KR2018/001251 (PCT/ISA/237).

* cited by examiner

TRANSMISSION APPARATUS, CELL MULTIPLEXING METHOD THEREOF, RECEPTION APPARATUS, AND CELL DE-MULTIPLEXING METHOD THEREOF

TECHNICAL FIELD

This disclosure relates to a transmission apparatus, a cell multiplexing method thereof, a reception apparatus, a cell demultiplexing method thereof and, more particularly, to a transmission apparatus which maps a cell to a frame and transmits the same, a cell multiplexing method thereof, a reception apparatus which demultiplexes a cell from a received frame, and a cell demultiplexing method thereof.

BACKGROUND ART

Recently, a broadcast communication service gradually has multi-functions, wider bands, and higher quality. In particular, according to the development of an electronic technology, supply of a portable broadcasting device such as a high-definition digital TV and a smartphone of a high specification, or the like, is increasing, and accordingly, there is an increasing demand for various reception methods and various service support for broadcast services.

According to this demand, as an example, a broadcast communication standard such as Advanced Television System Committee (ATSC) 3.0 has been developed. Accordingly, there is a need to develop a method for transceiving and processing a signal to correspond to a method proposed in ATSC 3.0.

DISCLOSURE

Technical Problem

The disclosure provides a transmission apparatus which maps a dummy cell to a subslice, a cell multiplexing method thereof, a reception apparatus which demultiplexes a cell received from the transmission apparatus, and a cell demultiplexing method thereof, in order to satisfy a condition defined in ATSC 3.0 standards with reference to the subslice.

Technical Solution

According to an embodiment of the disclosure, a transmission apparatus for multiplexing cells of a plurality of physical layer pipes (PLPs) includes a frame builder to, for each PLP, based on a number of cells of the PLP to be transmitted in one subframe and a number of predetermined subslices, calculate a size of the subslice, compare a value calculated based on the size of the subslices and the number of the subslices with a number of the cells of the PLP to determine whether to insert a dummy cell, and map a cell of the PLP included in the subslice to a subframe, and a transmission unit for transmitting the subframe to a reception apparatus, and at least one of the subslices comprises the dummy cell depending on whether the dummy cell is inserted.

The frame builder may calculate the size of the subslice on a basis of Equation 1.

The frame builder, when a value calculated based on the size of the subslice and the number of the subslice is greater than or equal to the number of cells of the PLP, may determine to insert the dummy cell.

When Equation 2 is not satisfied, the frame builder may determine to insert the dummy cell.

When it is determined that the dummy cell is inserted, the frame builder may calculate the number of the dummy cell.

The frame builder may calculate the number of the dummy cells based on Equation 3.

The frame builder may map the dummy cell from a first cell of a first subslice from among the subslices.

The frame builder may map the dummy cell from a final cell of a final subslice, from among the subslices.

The frame builder may map the dummy cell to a first cell of at least one subslice, from among the subslices.

The frame builder may map the dummy cell to a final cell of at least one subslice, from among the subslices.

The frame builder may map a subslice of a first PLP to the subframe, and map a subslice of a second PLP from an index subsequent to an index of the subframe to which the subslice of the first PLP is mapped.

According to an embodiment, a method for multiplexing of cells of a plurality of physical layer pipes (PLPs) includes, for each PLP, based on a number of cells of the PLP to be transmitted in one subframe and a number of predetermined subslices, calculating a size of the subslice, comparing a value calculated based on the size of the subslices and the number of the subslices with a number of the cells of the PLP to determine whether to insert a dummy cell, and mapping a cell of the PLP included in the subslice to a subframe, and at least one of the subslices may include the dummy cell depending on whether the dummy cell is inserted.

The determining may include, when Equation 2 is not satisfied, determining to insert the dummy cell.

According to an embodiment, a reception apparatus for demultiplexing cells of a plurality of PLPs includes a reception unit for receiving a subframe from a transmission apparatus, and a frame de-builder to, for each PLP, on a basis of a number of cells of the PLP to be transmitted through one subframe and a number of a predetermined subslices, calculate a size of the subslice, compare a value calculated on the basis of the size of the subslices and the number of subslices with a number of the cells of the PLP to determine whether a dummy cell is inserted in the subframe, and based on the dummy cell being inserted, de-map the cells of the PLP from the subframe excluding the dummy cells.

The frame de-builder may calculate a size of the subslice based on Equation 1.

The frame builder, based on a value calculated based on the size of the subslice and the number of the subslice being greater than or equal to the number of cells of the PLP, may determine to insert the dummy cell.

When Equation 2 is not satisfied, the frame builder may determine to insert the dummy cell.

When it is determined that the dummy cell is inserted, the frame builder may calculate the number of the dummy cell.

The frame builder may calculate the number of the dummy cells based on Equation 3.

The frame de-builder may determine the cell to which the dummy cell is mapped in the subframe, and demap the cells of the PLP excluding the dummy cells from the subframe.

Advantageous Effects

As set forth above, according to the diverse embodiments of the disclosure, using a minimum dummy cell, a parameter value for the number of cells of the PLP may be set with diverse values, while complying with the ATSC 3.0 standard.

DETAILED DESCRIPTION OF EXEMPLARY EMBODIMENTS

Figure 1:
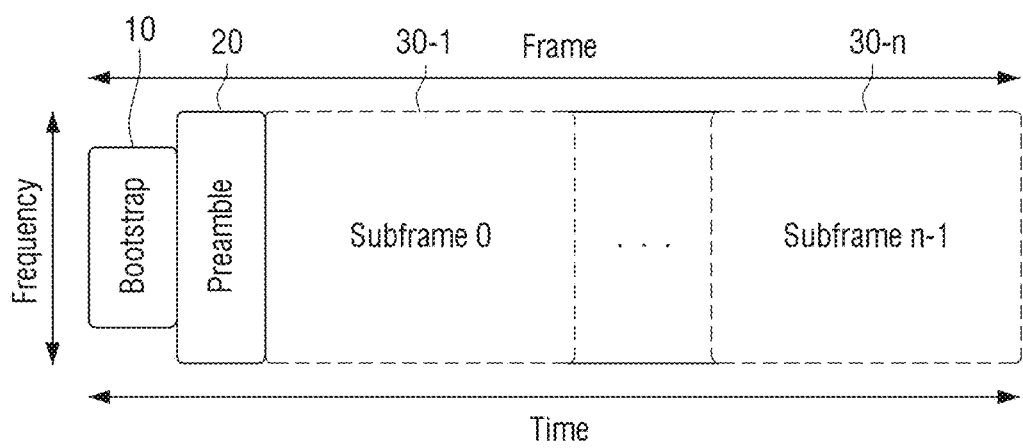
FIG. 1 is a view provided to describe a frame structure defined in ATSC 3.0 standard.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

When a certain portion "includes" a certain element, unless specified to the contrary, this means that another element may be additionally included, rather than precluding another element. The term such as an element, a unit, a module, or the like, in the specification refers to a unit that performs at least one function or operation, and such element may be implemented as hardware or software, or a combination of hardware and software.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

The disclosure will be described in greater detail with reference to the attached drawings.

According to an embodiment, a transmission apparatus may generate a cell for each input data by receiving a plurality of data, and processing each input data by a physical layer pipe (PLP) to which independent coding and modulation are applied.

Here, the PLP refers to a logical channel in a physical layer that conveys service data or related metadata capable of conveying one or a plurality of services or service components. That is, the PLP means a path through which each service is transmitted or a stream transmitted through the path.

Figure 2:
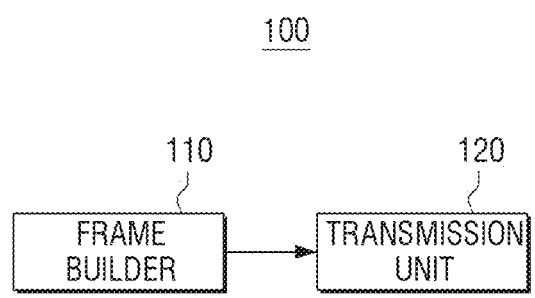
FIG. 2 is a block diagram provided to describe a configuration of a transmission apparatus according to an embodiment.

More specifically, a transmission apparatus 100 of FIG. 2 may generate baseband packets, for each PLP, by performing input formatting of each input data through an input formatting module (not shown), and generate cells (or data cells) for each PLP by performing forward error correction (FEC), interleaving and modulating for each baseband packet through a bit interleaved coding and modulation (BICM) module (not shown).

The transmission apparatus 100 may perform time interleaving of cells of each PLP through a framing and interleaving module (not shown), and map the time-interleaved cells to a frame on a frequency domain. At this time, the transmission apparatus 100 may perform frequency interleaving of the cells mapped to an orthogonal frequency division multiplexing (OFDM) symbol of a frame, through the framing and interleaving module (not shown), for some cases.

The transmission apparatus 100 may, through a waveform generation module (not shown), insert a pilot to a frame, convert the OFDM symbols of the frame to time domain through an Inverse Fast Fourier Transform (IFFT), perform reduction of peak to average power ratio (PAPR) by using a reserve tone, and insert a guard interval to the frame. In addition, the transmission apparatus 100 may transmit a signal to a reception apparatus (not shown). For this purpose, the transmission apparatus 100 may include at least one transmission antenna (not shown).

In the meantime, the transmission apparatus 100 may process L1 signaling including information necessary to process input data, map the L1 signaling to the frame, and transmit the same to a reception apparatus (not shown).

This process briefly describes a method of processing the input and L1 signaling according to a method defined in the ATSC 3.0 standard, and the transmission apparatus according to an embodiment may process input data and L1 signaling according to a method defined in the ATSC 3.0 standard.

According to the ATSC 3.0 standard, as illustrated in FIG. 1, the frame may be composed of a bootstrap 10, a preamble 20, and at least one subframe 30-1, . . . , 30-n.

Specifically, the bootstrap 10 is located at the beginning of the frame, the preamble 20 is located next to the bootstrap 10, and at least one subframes 30-1, . . . , 30-n may be located next to the preamble 20.

They are composed of at least one OFDM symbols, and the number of carriers of each OFDM symbol may be determined according to a fast Fourier transform (FFT) mode (that is, FFT size).

In the meantime, the subframe may include a subframe boundary symbol located at a boundary between the other subframes and a data symbol located between the subframe boundary symbols. However, this is merely exemplary, and the subframe may be composed of only data symbols. In addition, only a first symbol or a last symbol in the subframe may correspond to a subframe boundary symbol, and the remaining symbols may be composed of data symbols.

Meanwhile, as described above, the framing and interleaving module (not shown) may map the cells of the plurality of PLPs to the subframe. At this time, the cells of the plurality of PLPs may be multiplexed, and cells of a plurality of PLPs are mapped to cells of each subframe, and this will be described in greater detail below.

FIG. 2 is a block diagram provided to describe a configuration of a transmission apparatus according to an embodiment.

Referring to FIG. 2, the transmission apparatus 100 includes a frame builder 110 and a transmission unit 120.

The frame builder 110 maps the cells of the plurality of PLPs to cells of a subframe (that is, data cells of a subframe).

Here, the cells of the subframe are cells of the OFDM symbols (that is, carriers or sub-carriers), and may correspond to cells excluding the cells in which pilot is inserted in a subframe, the cells which are used for PAPR reduction, or the cells used as a null.

In this case, the frame builder 110 may perform indexing for cells of the subframe.

Also, the frame builder 110 may map the subslice of another PLP from the next cell of the cell to which the subslice of the PLP is mapped.

For example, the frame builder 110 may map the subslice of the first PLP to a subframe and map a subslice of the second PLP from the index next to the index of the subframe to which the subslice of the first PLP is mapped.

Hereinbelow, a method of mapping cells of the non-dispersed PLP and the dispersed PLP will be described with FIG. 4 as an example.

At this time, the PLP size (PLP_SIZE) (i.e., $S_{PLP}$), PLP type (PLP_TYPE), starting position (STARTING_POSITION), number of subslices (#of SUBSLICES) (that is, $N_{subslices}$), and the interval of subslices (SUBSLICES_INTERVAL) are as illustrated in FIG. 1. The parameter as Table 1 may be predetermined in the system.

TABLE 1

| PLP_ID | PLP_SIZE | PLP_TYPE | STARTING_POSITION | # of SUB-SLICES | SUB_SLICE_INTERVAL |
|---|---|---|---|---|---|
| A | 10 | Non-disp | 000 | n/a | n/a |
| B | 10 | Non-disp | 010 | n/a | n/a |
| C | 80 | Dispersed | 020 | 20 | 12 |
| D | 60 | Dispersed | 024 | 20 | 12 |
| E | 60 | Dispersed | 027 | 20 | 12 |
| F | 40 | Dispersed | 030 | 20 | 12 |

Figure 3:
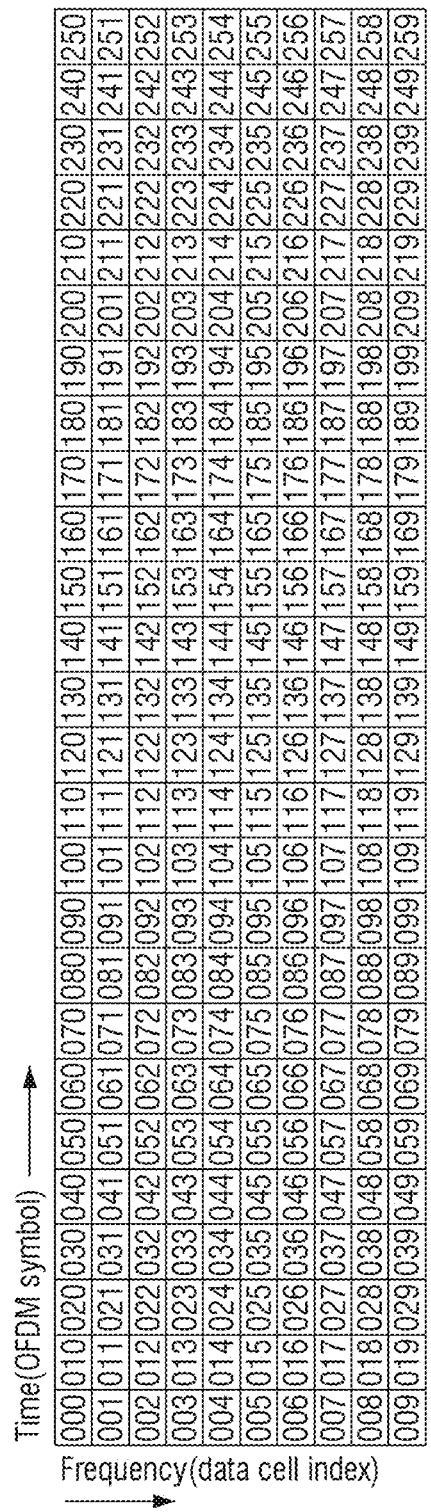
FIG. 3 is a view provided to describe a cell indexing method according to an embodiment.

For example, as shown in FIG. 3, the frame builder 110 may perform indexing 0 to the first cell, and indexing for cells while increasing by 1 from the next cell.

In addition, the frame builder 110 may map the cells of a plurality of PLPs to the cells to which the index (that is, the cell index) is assigned.

At this time, the frame builder 110 may map the cells of the PLPs to cells of the subframe in different ways depending on the type of the PLP.

Specifically, the PLP may be divided into a non-dispersed PLP and a dispersed PLP according to a type of the PLP. Meanwhile, whether the PLP corresponds which type of PLP may be predetermined in a system.

First, in the case of the non-dispersed PLP, the frame builder 110 may sequentially map the non-dispersed PLP cells from a cell having a specific index in a subframe. Accordingly, the cells of non-dispersed PLP may be mapped to cells having a successive index.

In the meantime, in the case of the dispersed PLP, the frame builder 110 may divide the cells of the dispersed PLPs to at least two subslices. For this purpose, the frame builder 110 may calculate the size of the subslice based on Equation 1.

$$S_{subslice} = \lceil S_{PLP}/N_{subslices} \rceil \quad \text{Equation 1}$$

Here, $S_{subslice}$ is the size of a subslice, and $N_{subslices}$ is the number of a subslice. In addition, the $S_{PLP}$ is the number of cells included in the PLP (that is, PLP size). Specifically, the $S_{PLP}$ is the number of cells included in the PLP transmitted in one subframe. In addition, $\lceil x \rceil$ means the integer same as X or the least integer greater than or equal to X.

The frame builder 110 may map subslices of the PLP to cells spaced apart by a predetermined interval.

Specifically, the frame builder 110 may sequentially map cells included in the subslice of the PLP from a cell having a specific index, and sequentially map the cells included in the next subslice of the PLP from a cell having an index spaced apart by a predetermined distance based on the specific index.

Here, the starting position indicates the cell index of the subframe to which the first cell included in the first subslice of the PLP is mapped, and the interval of the subslice indicates the interval between the cell index of the subframe to which the sub-slice of the PLP is mapped and the cell index of the subframe to which the next subslice is mapped.

Figure 4:
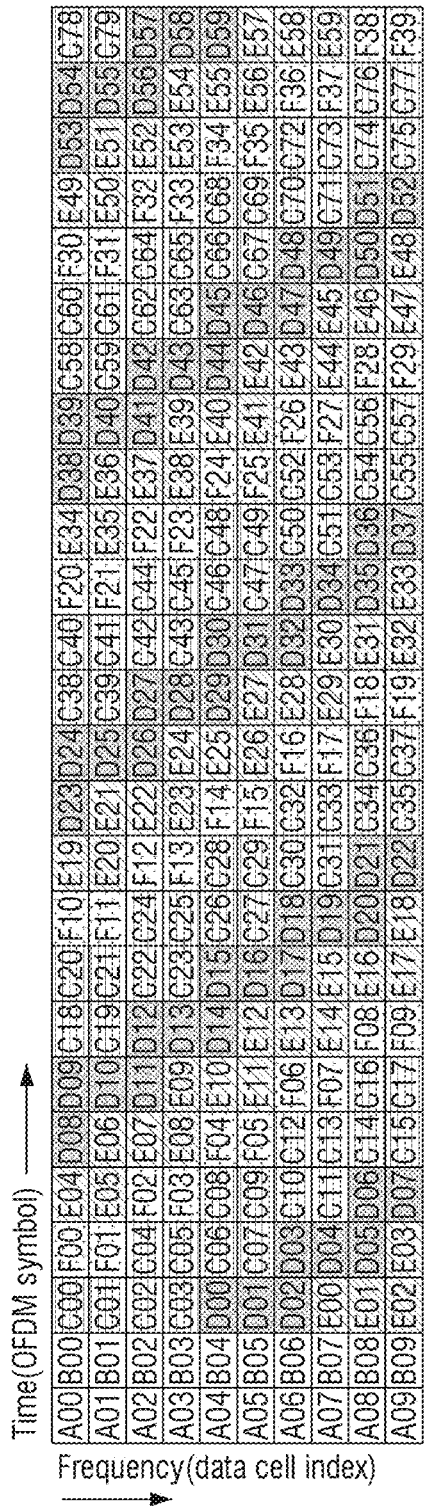
FIG. 4 is a view provided to describe a cell multiplexing method according to an embodiment.

Referring to FIG. 4, PLP (A) and PLP (B) of which PLP_ID is A and B correspond to the non-dispersed PLP, and in this regard, the frame builder 110 may map the cells of the PLP (A) and PLP (B) from the starting position.

Specifically, in the case of PLP (A), the PLP (A) includes ten cells, and the starting position is 0, and thus, the frame builder 110 may sequentially map the cells of the PLP(A) of which index is 0 to 9 (A00 to A09 in FIG. 4).

In the case of PLP(B), the PLP(B) includes ten cells and the starting position is 10 and thus, the frame builder 110 may sequentially map the cells of the PLP(B) of which the index is from 10 to 19 (B00 to B09 in FIG. 4).

In the meantime, the PLP (C) of which PLP_ID is C corresponds to the dispersed PLP and the frame builder 110 calculates the size of the subslice of the PLP (C). In this case, $S_{PLP}=80$ and $N_{subslices}=20$, and thus, the frame builder 110 may calculate $S_{subslice}$ as $S_{subslice} = \lceil 80/20 \rceil = 4$.

At this time, the PLP (C) includes 80 cells, and the number of subslices is 20, and thus, the cells of PLP (C) may be mapped to each subslice by four cells.

Since the starting position of is 20, the frame builder 110 may map four cells (for example, first to fourth cells of the PLP (C)) included in the first slice from a cell having an index of 20 to a cell having an index of 23 (C00 to C03 of FIG. 4). In addition, the interval of the subslice is 12, thus, the frame builder 110 may map four cells (for example, the fifth cell to eighth cell of PLP (C)) included in the second slice from a cell spaced apart by the interval of 12 from the cell having an index of 20, that is, a cell having an index of 32 to a cell having an index of 35 (C04 to C07 of FIG. 4).

According to this method, the frame builder 110 may map the cells included in the remaining slices to the cells of the subframe. As a result, four cells (for example, 77th cell to 80th cells of the PLP (C)) included in the 20th slice may be mapped from the cell having an index of 248 to a cell having an index of 251 (C76 to C79 in FIG. 4).

In the meantime, the PLP (D) of which PLP_ID is D corresponds to the dispersed PLP and the frame builder 110 calculates the size of the subslice of PLP (D). In this case, $S_{PLP}=60$, and $N_{subslices}=20$, the frame builder 110 may calculate the $S_{subslice}$ as $S_{subslice}=\lceil 60/20 \rceil=3$.

At this time, since the PLP (D) includes 60 cells and the number of subslices is 20, cells of PLP (D) may be included in each subslice by three.

Since the starting position is 24, the frame builder 110 maps three cells (for example, first to third cell of PLP(D)) included in the first slice from a cell having an index of 24 to a cell having an index of 26 (D00 to D02 of FIG. 4). In addition, the interval of the subslice is 12, thus, the frame builder 110 may map three cells (for example, fourth to sixth cells of PLP (D)) included in the second slice from a cell spaced apart by the interval of 12 from the cell having an index of 24, that is, a cell having an index of 36 to a cell having an index of 38 (D03 to C05 of FIG. 4).

According to this method, the frame builder 110 maps the cells included in the remaining slices to the cells of the subframe. As a result, three cells (for example, $58^{th}$ to $60^{th}$ cells of PLP(D)) included in the 20th slice may be mapped to a cell having an index of 252 to a cell having an index of 254 (D57 to D59 of FIG. 4).

In the meantime, the PLP (E) of which PLP_ID is E corresponds to the dispersed PLP and the frame builder 110 calculates the size of the subslice of PLP (E). In this case, $S_{PLP}=60$, and $N_{subslices}=20$, and the frame builder 110 may calculate the $S_{subslice}$ as $S_{subslice} \lceil 60/20 \rceil=3$.

At this time, since the PLP (E) includes 60 cells and the number of subslices is 20, cells of PLP (E) may be mapped to each subslice by three.

Since the starting position is 27, the frame builder 110 may map three cells (for example, first to third cells of PLP(E)) included in the first slice from a cell having an index of 27 to a cell having an index of 29 (E00 to E02 of FIG. 4). In addition, the interval of the subslice is 12, thus, the frame builder 110 may maps three cells (for example, fourth to sixth cells of PLP (E)) included in the second slice from a cell spaced apart by the interval of 12 from the cell having an index of 27, that is, a cell having an index of 39 to a cell having an index of 41 (E03 to E05 of FIG. 4).

According to this method, the frame builder 110 maps the cells included in the remaining slices to the cells of the subframe. As a result, the three cells included in the $20^{th}$ slice (for example, $58^{th}$ cell to $60^{th}$ cell of PLP(E)) may be mapped from a cell having an index of 255 to a cell having an index of 257 (E57 to E59 of FIG. 4).

In the meantime, the PLP (F) of which PLP_ID is F corresponds to the dispersed PLP, and the frame builder 110 calculates the size of the subslice of PLP (F). In this case, $S_{PLP}=40$, and $N_{subslices}=20$, and the frame builder 110 may calculate the $S_{subslice}$ as $S_{subslice}=\lceil 40/20 \rceil=2$.

At this time, the PLP (F) includes 40 cells, and the number of subslices is 20, and thus, cells of the PLP (F) may be mapped to each subslice by two.

Since the starting position is 30, the frame builder 110 may map two cells (for example, first to second cells of PLP(F)) included in the first slice from a cell having an index of 30 to a cell having an index of 31 (F00 to F01 of FIG. 4). In addition, the interval of the subslice is 12, thus, the frame builder 110 may map two cells (for example, third to fourth cells of PLP (F)) included in the second slice from a cell spaced apart by the interval of 12 from a cell having an index of 30, that is, a cell having an index of 42 to a cell having an index of 43 (F02 to F03 of FIG. 4).

According to this method, the frame builder 110 maps the cells included in the remaining slices to the cells of the subframe. As a result, the two cells included in the $20^{th}$ slice (for example, $39^{th}$ cell to $40^{th}$ cell of PLP (F)) may be mapped from a cell having an index of 258 to a cell having an index of 259 (F38 to F39 of FIG. 4).

As described above, the cells of the non-dispersed PLP are mapped to the cells having an adjacent index in the subframe. In the meantime, in the case of the dispersed PLP, the cells included in one subslice are mapped to cells having an adjacent or successive index in the subframe, but the cells included in each of the two successive subslices may be mapped to the cells having indices which are not adjacent to each other.

In the meantime, the ATSC 3.0 standard includes the restrictive conditions as shown below, with regard to the number of the cells mapped to the subslice of the dispersed PLP.

In the subframe, all the slices of the dispersed PLP shall have the same non-zero size except for of the last subslice.

The size of the last subslice of the dispersed PLP shall be greater than zero and less than or equal to the size of the other subslices of the same dispersed PLP within the same subframe.

However, due to the restrictive conditions, there may exist a non-usable $S_{PLP}$ value (that is, the number of cells of PLP) according to the number of subslices.

That is, in that the number of the cells of the PLPs and the number of the subslices are predetermined, the size of the subslices is calculated by using the method such as Equation 1, and the cells of PLP are mapped to a subframe using the calculated size of the subslice, there may be the number of the cells of PLP which may not be used according to the number of subslices.

For example, it is assumed that the number of subslices is 10 and $S_{PLP}=81$. At this time, the size of the subslice may be calculated as $S_{subslice}=\lceil 81/10 \rceil=9$.

Figure 5:
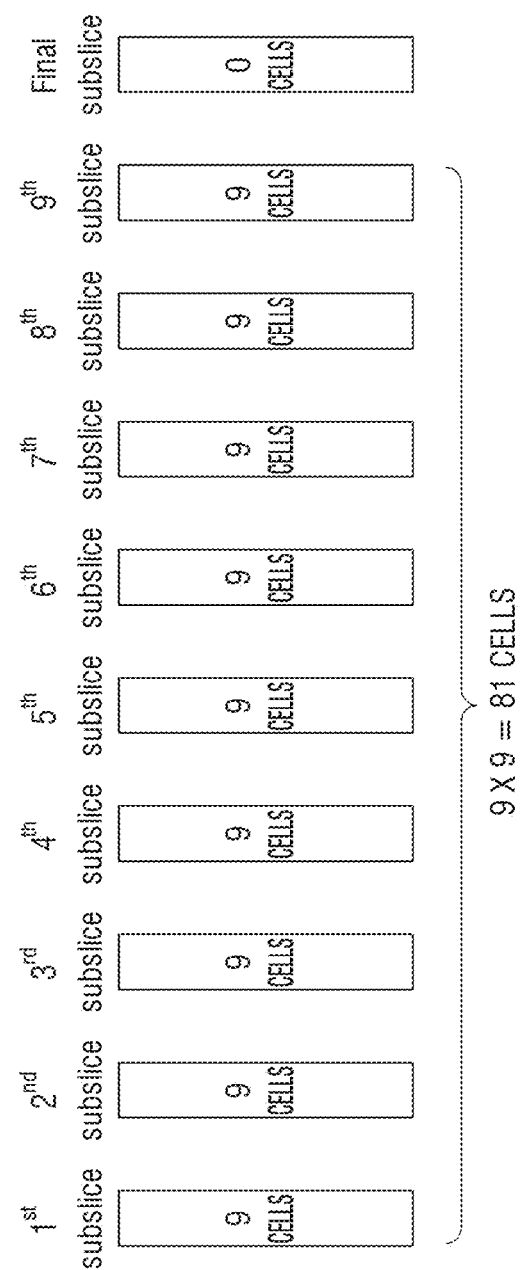
FIGS. 5 to 18 are views to describe a method for adding a dummy cell according to an embodiment.

In this case, as illustrated in FIG. 5, nine cells of PLP are mapped to the first subslice to the ninth subslice, respectively, and the number of the cells of PLP mapped to the last subslice is 0. That is, there is no cell of PLP mapped to the last subslice.

In this case, the restrictive condition that the number of cells mapped to the last subslice shall be greater than 0 is not met. As a result, with the method defined in the ATSC 3.0, when the number of subslices is 10, $S_{PLP}=81$ may not be used.

Figure 6:
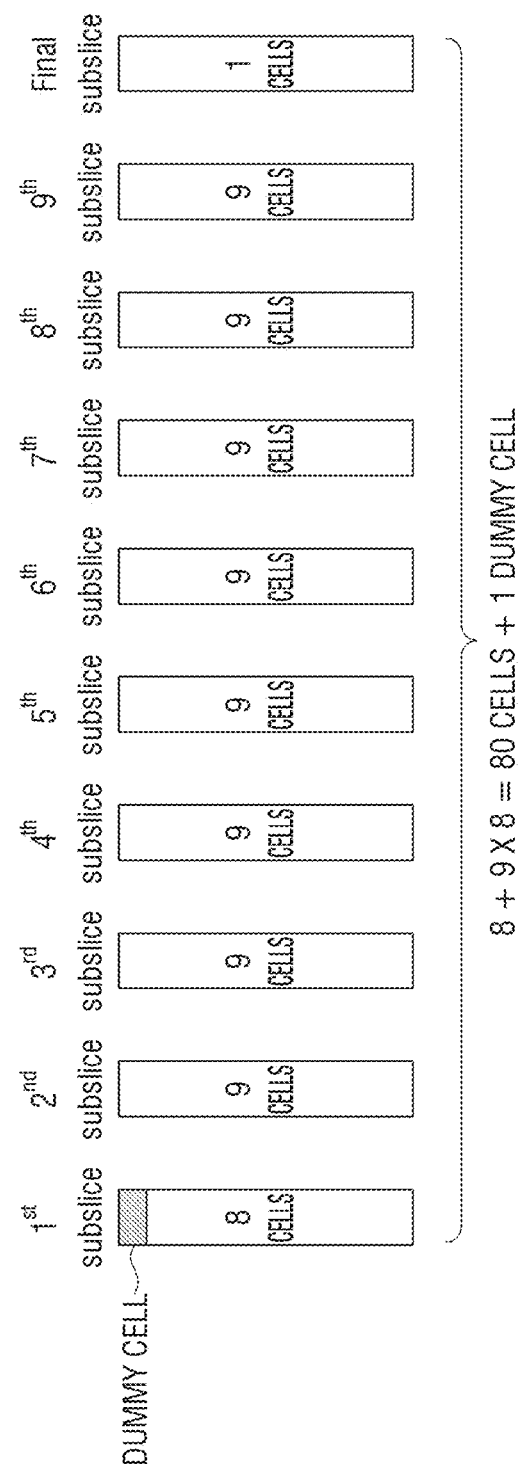

In order to solve the above problem, in the disclosure, one dummy cell is mapped to the first cell of the first subslice, so that one cell of PLP is mapped to the last subslice as in FIG. 6. Accordingly, the number of PLP cells mapped to the last subslice are greater than 0, and the restrictive condition defined in the ATSC 3.0 standard is satisfied. When the number of subslice is 10, $S_{PLP}=81$ may be used.

As such, in the disclosure, a minimum number of dummy cells are added to the subslice so as to satisfy the ATSC 3.0 standard and use various $S_{PLP}$ values. This will be further described below.

First, for each PLP, the frame builder 110 may calculate the size of the subslice based on the number of cells of PLP transmitted through one subframe and the predetermined number of subslices.

Here, the number of cells of PLP (that is, $S_{PLP}$), a type of PLP, a starting position, the number of subslice (that is, $N_{subslices}$) and the interval of subslice may be predetermined in the system.

To be specific, the frame builder 110 may calculate the size of subslice of PLP using Equation 1.

The frame builder 110 may compare the value calculated based on the size of the subslice and the number of subslice with the number of cells of PLP, to determine whether to insert the dummy cell.

First of all, when the value calculated based on the size of the subslice and the number of subslice is greater than or equal to the number of cells of the PLP, the frame builder 110 may determine to insert the dummy cell.

To be specific, when Equation 2 is not satisfied, the frame builder 110 may determine to insert the dummy cell.

$$\lceil S_{PLP}/N_{subslices} \rceil \times (N_{subslices}-1) < S_{PLP} \quad \text{Equation 2}$$

Here, the $S_{PLP}$ is the number of cells of the PLP, and the $N_{subslices}$ is the number of subslice.

However, the frame builder 110 may determine not to insert a dummy cell when the value calculated based on the size of the subslice and the number of subslice is smaller than the number of cells of the PLP. That is, if Equation 2 is satisfied, the frame builder 110 may determine not to insert the dummy cell.

Thereafter, the frame builder 110 may map the cells of the PLP included in the subslice to the subframe. In this case, according to whether the dummy cell is inserted, at least one of the subslice may include the dummy cell.

First of all, if it is determined that the dummy cell is not inserted, the frame builder 110 may sequentially map the subslice of SLP to the cells of the subframe, without inserting the dummy cells. This has been described with FIG. 4 as an example.

If it is determined that the dummy cell is inserted, the frame builder 110 may calculate the number of dummy cells.

To be specific, the frame builder 110 may calculate the number of dummy cells based on Equation 3.

$$N_{dummy} = \lceil S_{PLP}/N_{subslices} \rceil \times N_{subslices} - S_{PLP} \quad \text{Equation 3}$$

Here, $N_{dummy}$ is the number of dummy cells, $S_{PLP}$ is the number of PLP cells, and $N_{subslices}$ is the number of subslices.

The frame builder 110 may map the cells of the PLPs and the dummy cells as many as the calculated numbers to the cells of the subframe.

For example, the frame builder 110 may map the dummy cell from the first cell of the first subslice among the subslices.

That is, the frame builder 110 may sequentially map the dummy cells as many as the calculated number from the first cell of the first subslice. At this time, if the calculated number of dummy cells is greater than the size of the subslice, the frame builder 110 may map the dummy cells which remain after being mapped to the first subslice to the next subslice sequentially.

In this case, the frame builder 110 may sequentially map the cells of the PLPs to the cells which remain after the dummy cells are mapped in the subslice.

As another example, the frame builder 110 may map dummy cells from the last cell of the last subslice, from among the subslices.

That is, the frame builder 110 may map the dummy cells from the last cell of the last subslice in the reverse order. Here, the last cell of the last subslice may be determined based on the size of the subslice, the number of subslices, the number of cells of the PLP, the number of dummy cells, or the like. At this time, if the calculated number of dummy cells is greater than the number of cells to which dummy cells may be mapped in the last subslice, the frame builder 110 may map the dummy cells which remain after being mapped to the last subslice to the previous subslice in reverse order.

In this case, the frame builder 110 may sequentially map the cells of PLP to the cells which remain after dummy cells are mapped in the subslice.

As a still another embodiment, the frame builder 110 may map the dummy cell to the first cell of the at least one subslice, among the subslices.

That is, the frame builder 110 may determine the subslice as many as the calculated number of dummy cells among the plurality of subslices of the PLP, and map the dummy cell to the first cell of each of the determined subslice.

For example, when the calculated number of dummy cells is N (N is an integer equal to or greater than 2), the frame builder 110 may map the dummy cell to the first cell of the first subslice, the first cell of the second subslice, . . . , and the first cell of the $N^{th}$ subslice. As another example, it is assumed that the number of subslices is M ($=N_{subslices}$), and the number of calculated dummy cells is N (N is an integer of 2 or more). In this case, the frame builder 110 may map the dummy cell to the first cell of the $M^{th}$ subslice, the first cell of the M-1$^{th}$ subslice, . . . , the first cell of the M-(N-1)$^{th}$ subslice.

This is merely exemplary, and the subslices to which the dummy cell is mapped may be determined in a diverse manner.

In this case, the frame builder 110 may sequentially map the cells of the PLPs to the cells which remain after the dummy cells are mapped in the subslice.

As a still another embodiment, the frame builder 110 may map the dummy cell to the last cell of the at least one subslice from among the subslices.

That is, the frame builder 110 may determine the subslice as many as the number of calculated dummy cells, among a plurality of subslices of the PLP, and map the dummy cells to the last cell of each of the determined subslices.

For example, when the calculated number of dummy cells is N (N is an integer equal to or greater than 2), the frame builder 110 may map the dummy cell to the last cell of the M ($=N_{subslices}$) subslice, the last cell of the M-1$^{th}$ subslice, . . . , and the last cell of the M-(N-1)$^{th}$ subslice. Here, the last cell of the last subslice may be determined based on the size of the subslice, the number of subslice, the number of cells of the PLP, the number of dummy cells, or the like. As another example, when the calculated number of dummy cells is N (N is an integer equal to or greater than 2), the frame builder 110 may map the dummy cell to the last cell of the first subslice, the last cell of the second subslice, . . . , and the last cell of the $N^{th}$ subslice.

This is merely exemplary, and the subslice to which the dummy cell is mapped may be determined in a diverse manner.

In this case, the frame builder 110 may sequentially map the cells of PLP to the cells which remain after the dummy cells are mapped in the subslice.

In addition to the above-described methods, the frame builder 110 may map dummy cells in various ways. For example, the frame builder 110 may randomly determine the location of a cell of the subslice to which the dummy cell is to be mapped, map the dummy cell to a cell of the determined subslice, and sequentially map the cells of the PLP to the cells which remain after the dummy cell is mapped in the subslice.

As such, the frame builder 110 may compare the value calculated based on the size of the subslice and the number of subslice with the number of cells of PLP to determine whether to insert the dummy cell, and selectively add the dummy cell when mapping the cells of the PLP to the subframe.

That is, when the cells of PLP are mapped to the subframe based on the number of subslice and the number of cells of PLP, the frame builder 110 may determine whether to satisfy the restrictive condition defined in the ATSC 3.0 standard.

The frame builder 110 may selectively add dummy cells when mapping PLP cells to subframes according to whether the restrictive condition defined in the ATSC 3.0 standard is satisfied. That is, the frame builder 110 does not add a dummy cell when the restrictive condition defined in the ATSC 3.0 standard is satisfied, but adds the dummy cell to the PLP if the restrictive condition defined in the ATSC 3.0 standard is not satisfied so that, when the cells of PLP are mapped to subframes, the restrictive condition defined in the ATSC 3.0 standard may be satisfied.

Hereinbelow, a method of additionally mapping the dummy cell to the subslice will be described with reference to FIGS. 7 to 18.

For example, it is assumed that the number of subslice is 20, and $S_{PLP}=90$. At this time, the size of the subslice may be calculated as $S_{subslice}=\lceil 90/20 \rceil = 5$.

In this case, five cells of PLP are mapped from the first subslice to the $18^{th}$ subslice, respectively, and the number of cells of PLP mapped to the $19^{th}$ subslice and the $20^{th}$ subslice is 0.

In this case, since the number of cells mapped to the $19^{th}$ subslice is different from the number of cells mapped to other subslices except for the last subslice, and the number of cells mapped to the $20^{th}$ subslice is 0, the restrictive condition defined in the ATSC 3.0 standard is not satisfied. Thus, according to the restrictive condition defined in the ATSC 3.0 standard, when the number of subslices is 20, $S_{PLP}=90$ may not be used.

However, in the disclosure, even in the case where the number of subslice is 20, and $S_{PLP}=90$, the dummy cell is added so as to satisfy the restrictive condition defined in the ATSC 3.0 standard. Accordingly, in the disclosure, even when the number of subslice is 20, $S_{PLP}=90$ may be used.

The frame builder 110 may determine whether Equation 2 is satisfied when $N_{subslices}=20$ and $S_{PLP}=90$.

Here, when $N_{subslices}=20$ and $S_{PLP}=90$, Equation 2 is not satisfied. In this regard, the frame builder 110 may determine to add the dummy cell and calculate the number of dummy cells to be added, based on Equation 3.

Here, the number of dummy cells to be added, $N_{dummy}$, is $\lceil 90/20 \rceil \times 20 - 90 = 10$.

In this case, the frame builder 110 may additionally map the dummy cells to the subslice through various methods.

For example, the frame builder 110 may sequentially map the dummy cell from the first cell of the first subslice among the subslices, and then sequentially map the cells of PLP.

Figure 7:
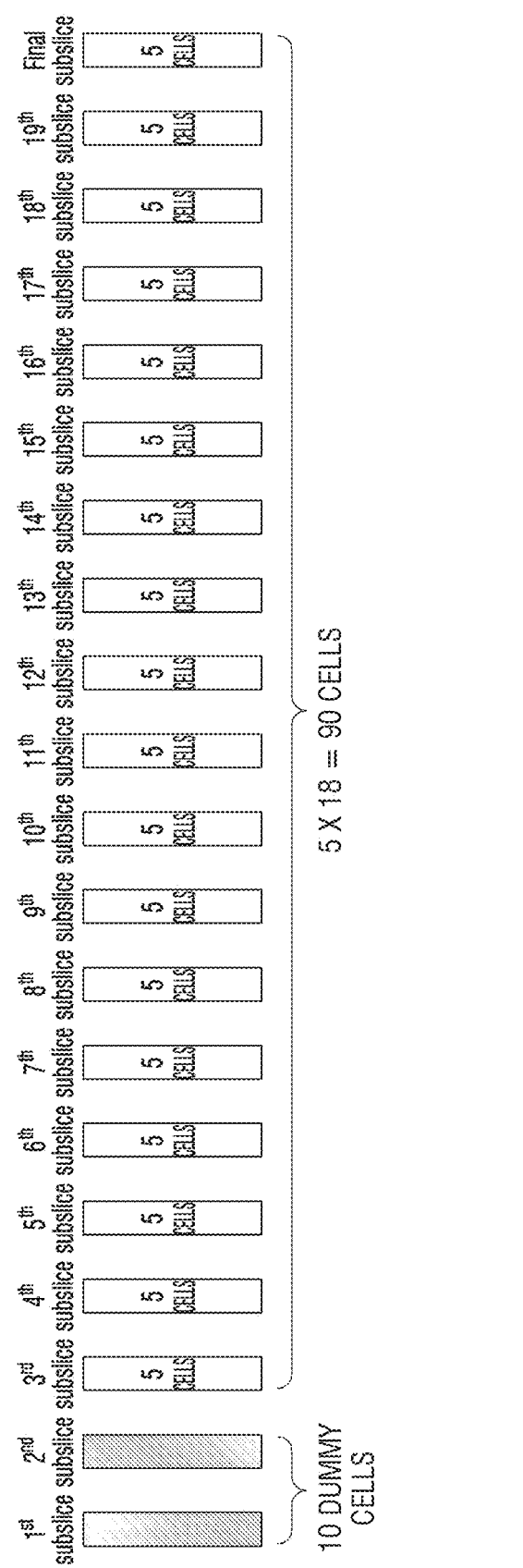

That is, as illustrated in FIG. 7, the frame builder 110 may map five dummy cells, respectively, to each of the first subslice and the second subslice, and map five cells of PLP, respectively, to the third subslice to the last subslice.

As another example, the frame builder 110 may map the dummy cell from the last cell of the last subslice, among the subslices, in a reverse order, and then sequentially map the cells of PLP.

Figure 8:
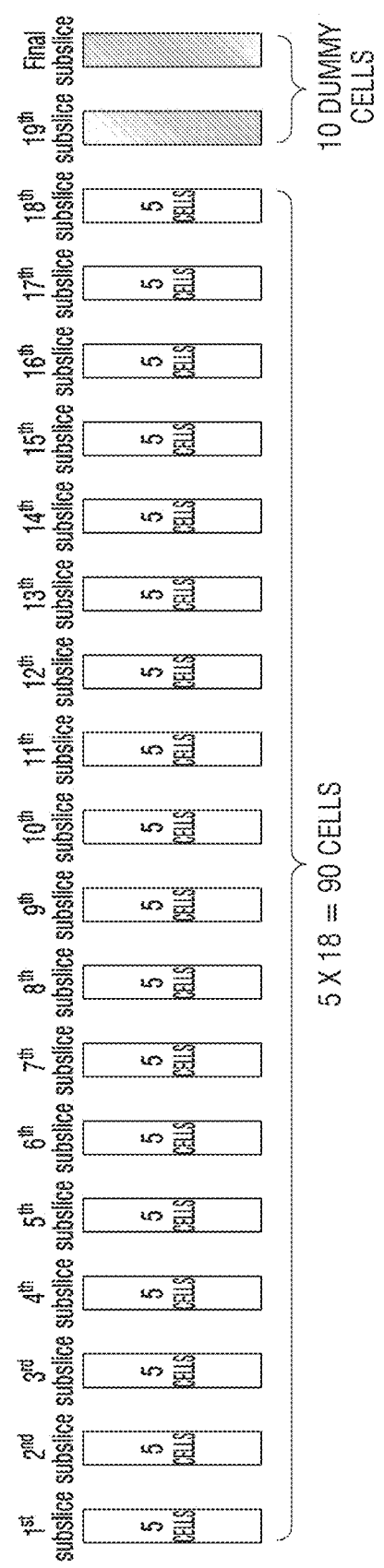

That is, as shown in FIG. 8, the frame builder 110 may map five cells of PLP from the first subslice to the $18^{th}$ subslice, respectively, and map five dummy cells to the $19^{th}$ subslice and the last subslice, respectively.

As a still another embodiment, the frame builder 110 may map the dummy cell to the first cell of the at least one subslice, from among the subslices, and then sequentially map the cells of PLP.

Figure 9:
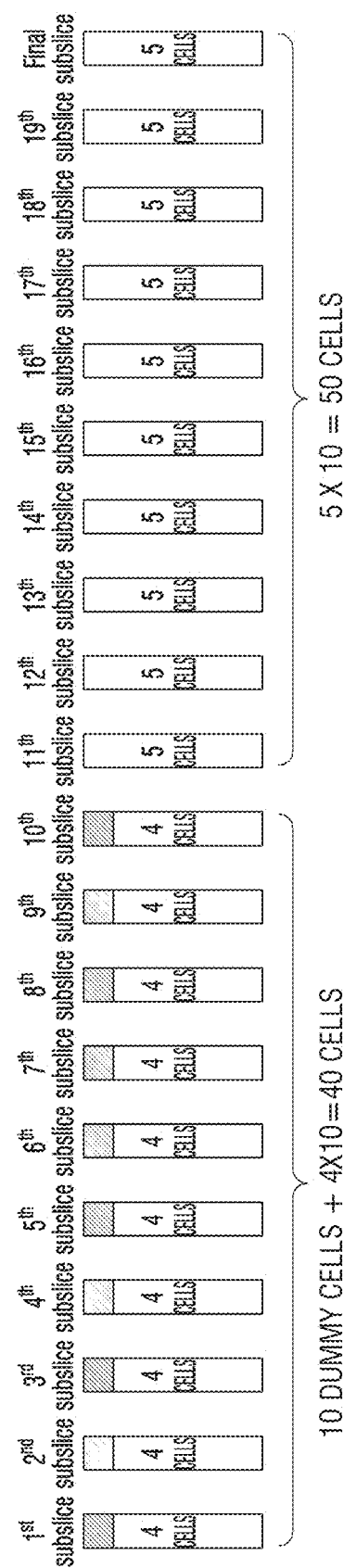

That is, as shown in FIG. 9, the frame builder 110 may map the dummy cells to the first cell from the first subslice to the tenth subslice, respectively, and map the cells of the PLP from the second to fifth cells of the first subslice to the second to fifth cells of the tenth subslice, respectively. Then, the frame builder 110 may map the five cells of PLP from the $11^{th}$ subslice to the last subslice, respectively.

Figure 10:
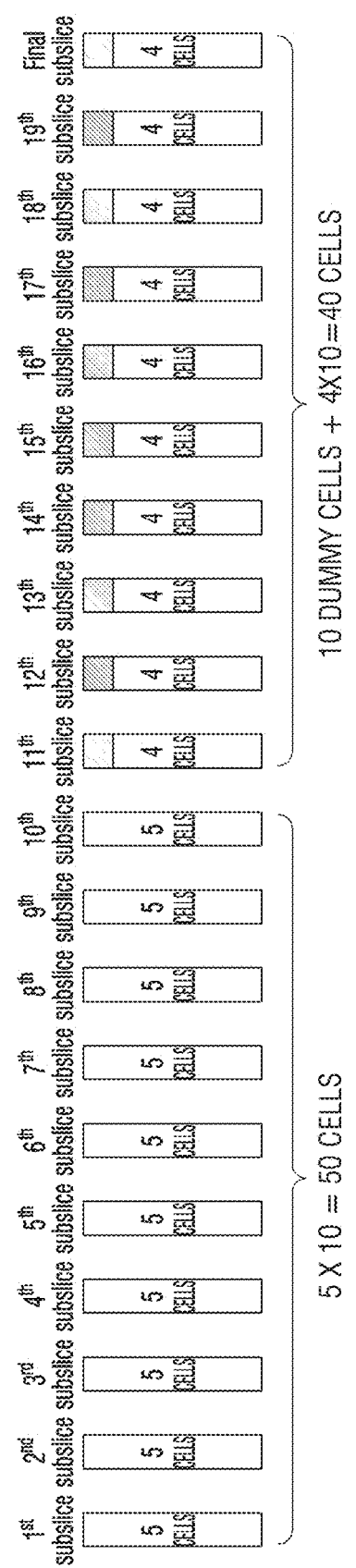

Also, as shown in FIG. 10, the frame builder 110 may map the five cells of PLP from the first subslice to the tenth subslice. The frame builder 110 may map the dummy cells from the first cell of the $11^{th}$ subslice to the first cell of the last subslice, respectively, and map the cells of PLP from the second to fifth cells of the $11^{th}$ subslice to the second to fifth cells of the last subslice, respectively.

As still another example, the frame builder 110 may map the dummy cell to the last cell of the at least one subslice, from among the subslices, and then sequentially map the cells of PLP.

Figure 11:
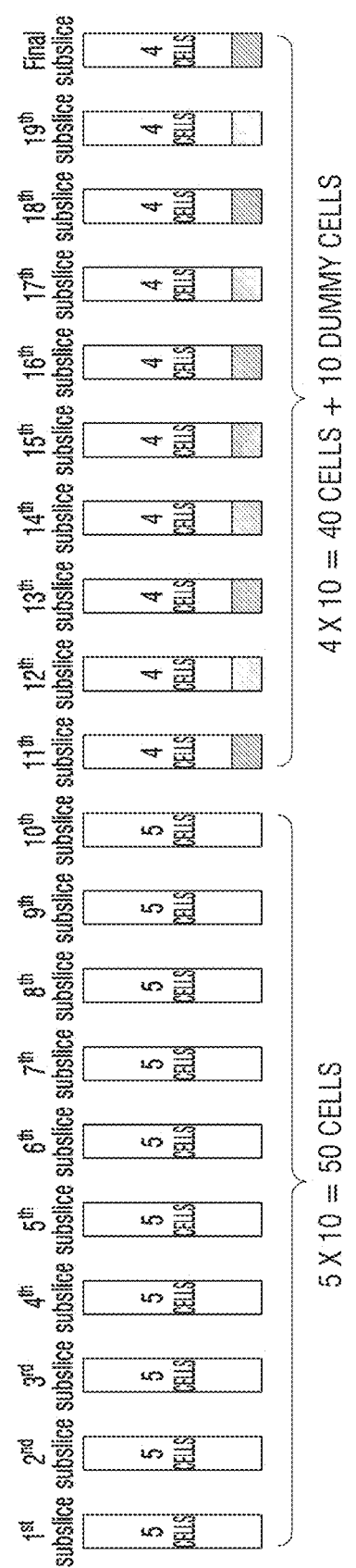

That is, as shown in FIG. 11, the frame builder 110 may map five cells of PLP to the first subslice to the tenth subslice, respectively. The frame builder 110 may map the dummy cells to the fifth cell from the $11^{th}$ subslice to the last subslice, respectively, and map the cells of PLP from the first cell to the fourth cell of the $11^{th}$ subslice to the first cell to the fourth cell of the last subslice.

Figure 12:
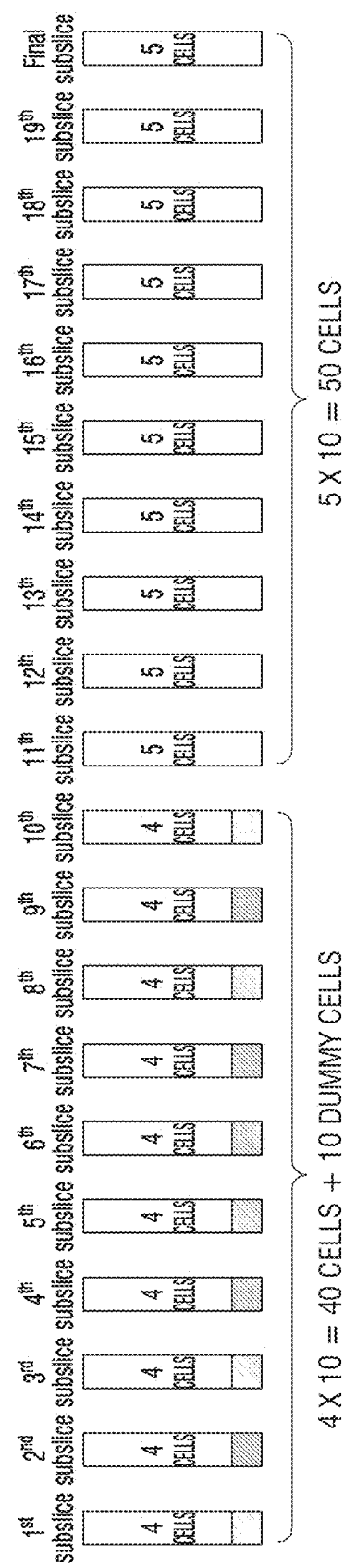

That is, as shown in FIG. 12, the frame builder 110 may map the dummy cells to the last cell from the first subslice to the tenth subslice, respectively, and map the cells of the PLP from the first to fifth cells of the first subslice to the first to fifth cells of the tenth subslice, respectively. Then, the frame builder 110 may map the five cells of PLP from the $11^{th}$ subslice to the last inal subslice, respectively.

In this way, according to an embodiment, when mapping the cells of PLP using the dummy cell, as shown in FIGS. 7 to 12, five cells are mapped to all of the first subslice to the $19^{th}$ subslice, and the same number of cells are mapped. In the last subslice as well, five cells are mapped, and the cells which are greater than 0 are mapped.

Accordingly, while the restrictive condition defined in the ATSC 3.0 standard is being satisfied, when the number of subslice is 20, $S_{PLP}=90$ may be used.

In the meantime, when the number of subslice is 20 and $S_{PLP}=90$, for example, the parameter related to the PLP and the subslice may be defined as Table 2 below.

TABLE 2

| PLP_ID | PLP_SIZE | PLP_TYPE | STARTING_POSITION | # of SUB-SLICES | SUB_SLICE_INTERVAL |
|---|---|---|---|---|---|
| A | 10 | Non-disp | 000 | n/a | n/a |
| B | 10 | Non-disp | 010 | n/a | n/a |
| C | 90 | Dispersed | 020 | 20 | 13 |
| D | 60 | Dispersed | 025 | 20 | 13 |
| E | 60 | Dispersed | 028 | 20 | 13 |
| F | 40 | Dispersed | 031 | 20 | 13 |

In the case of Table 2, the cells of PLP may be mapped to subframes as FIGS. 13 to 18.

In the meantime, a specific method of mapping the cells of PLP to subframes according to the size of PLP, the type of PLP, the starting position, the number of subslices, and the interval of subslice has been described above and thus, a detailed description will be omitted.

Referring to FIGS. 13 to 18, in the case of PLP (C), the dummy cell may be added, and the dummy cell may be inserted to various positions in the subframe.

Figure 13:
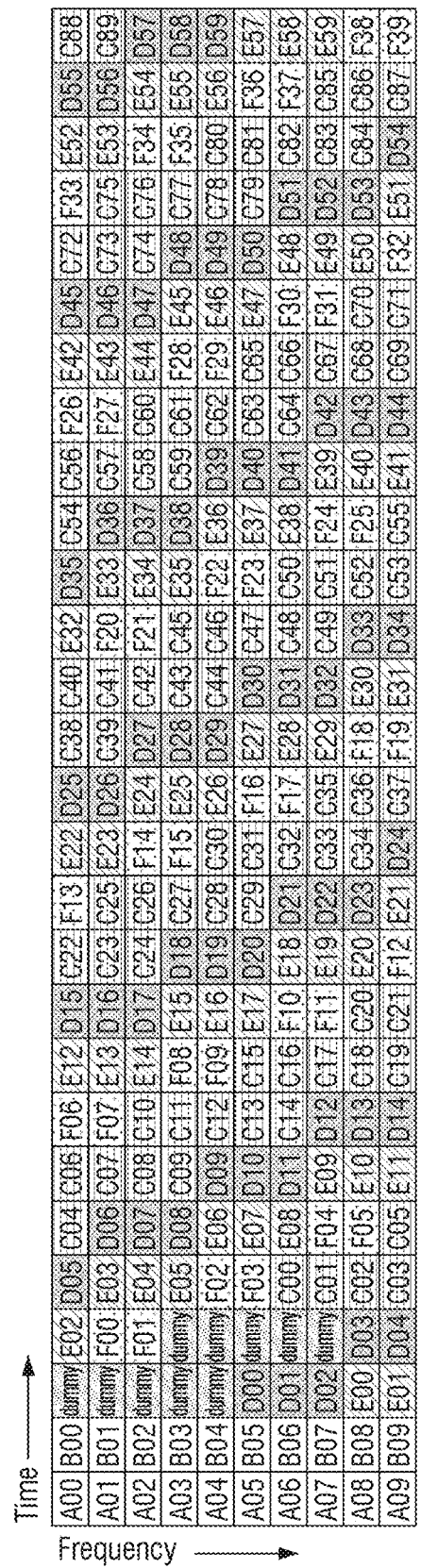
Figure 14:
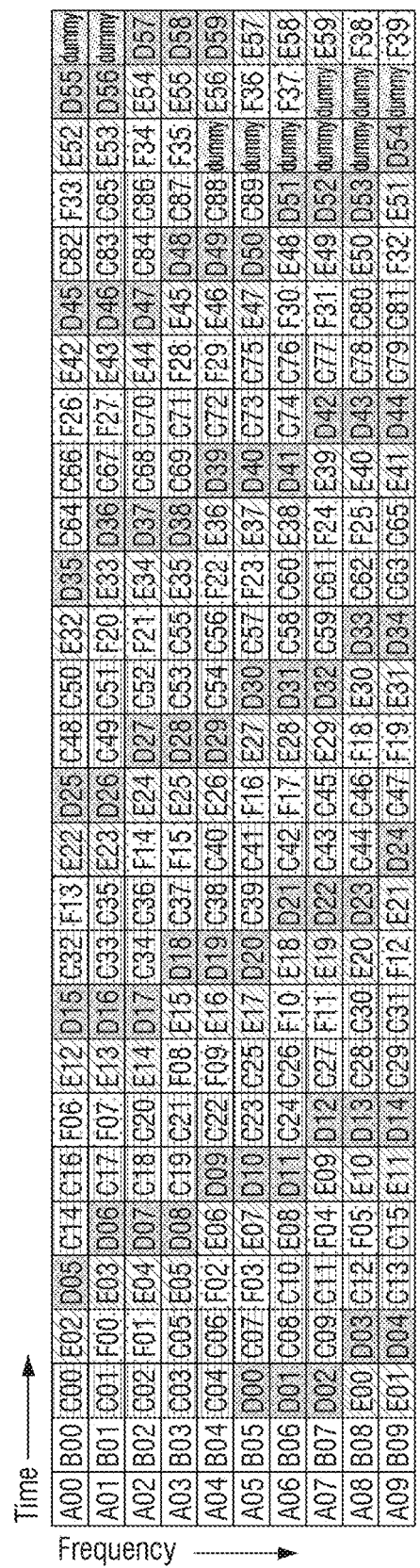
Figure 15:
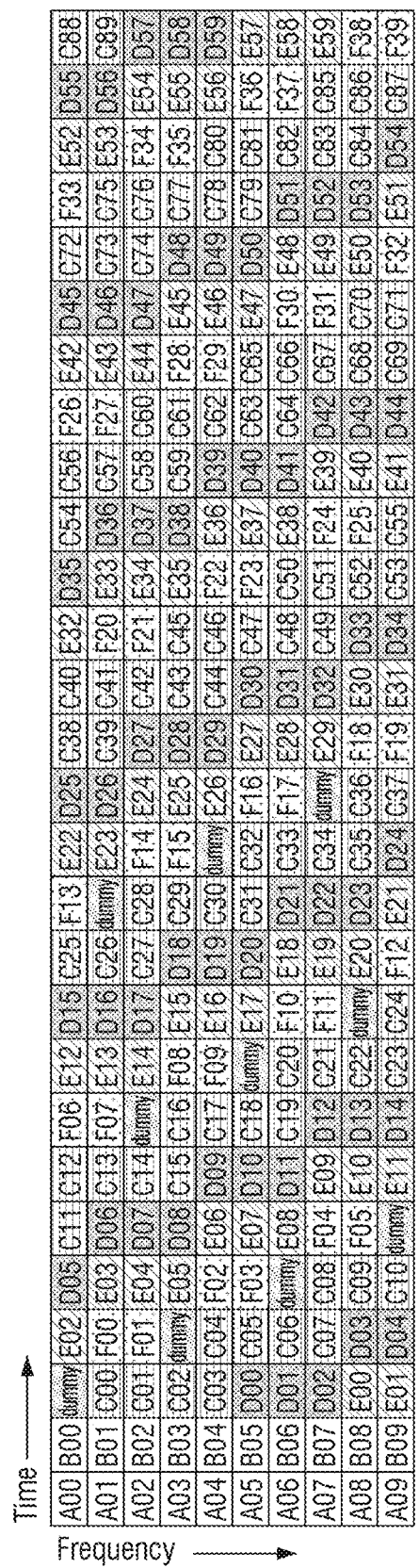
Figure 16:
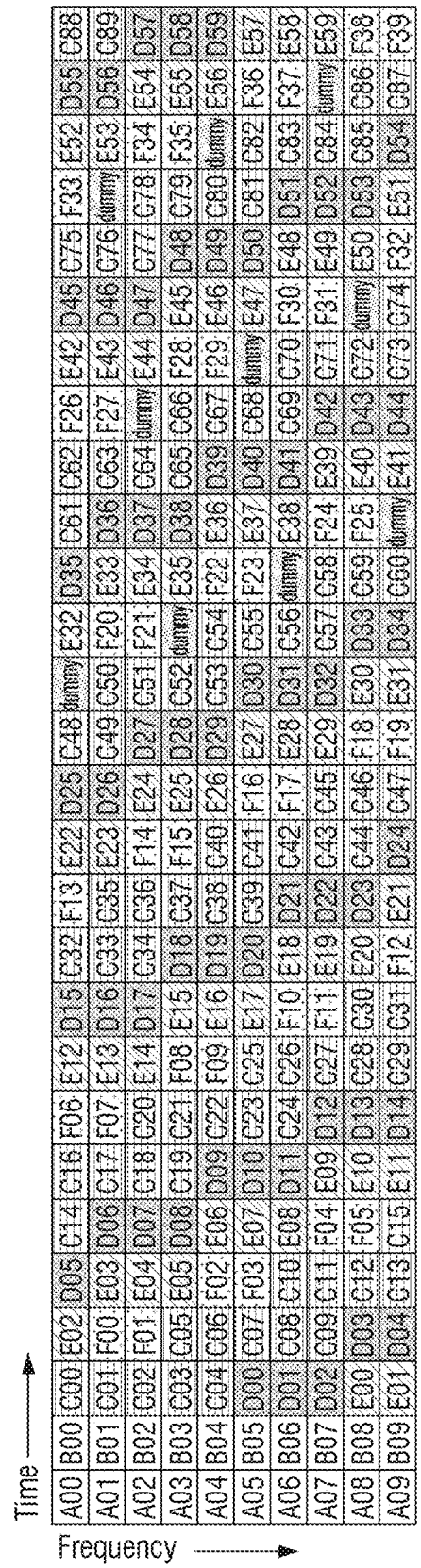
Figure 17:
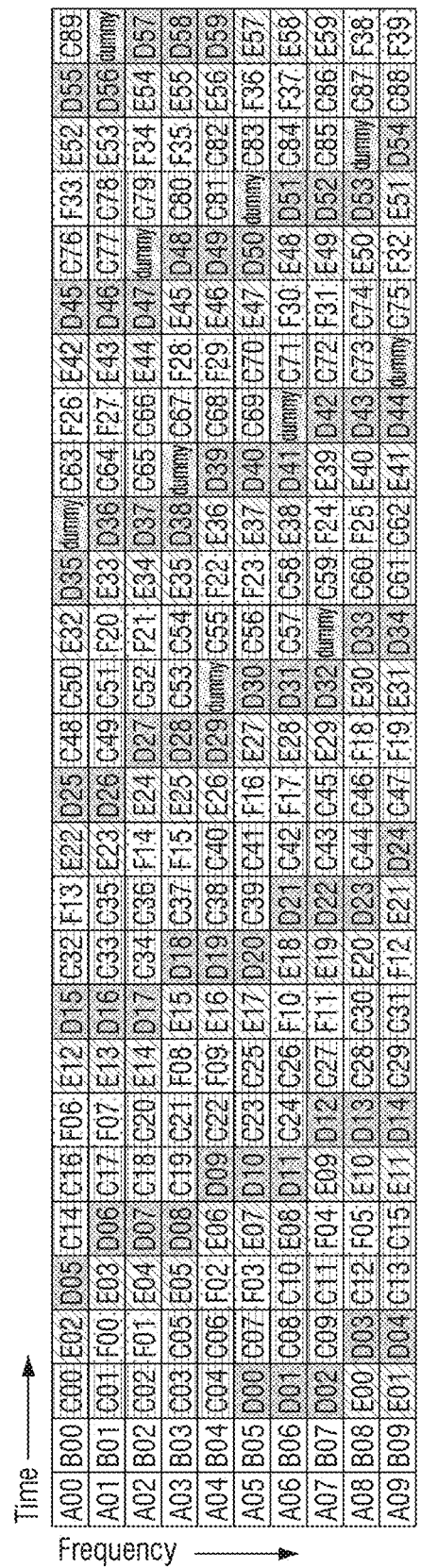
Figure 18:
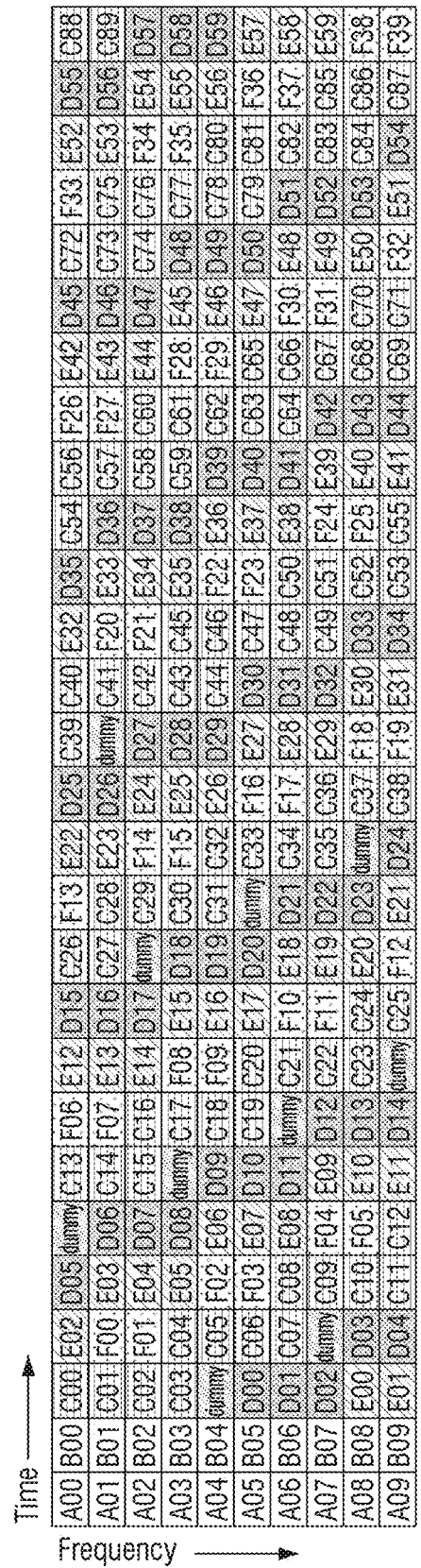

For example, in the case where the dummy cell is inserted as FIG. 7, the dummy cell may be mapped to the subframe as FIG. 13, when the dummy cell is inserted as FIG. 8, the dummy cell is mapped to the subframe as FIG. 14, when the dummy cell is inserted as FIG. 9, the dummy cell is mapped to the subframe as FIG. 15, when the dummy cell is inserted as FIG. 10, the dummy cell to mapped in the subframe as FIG. 16, when the dummy cell is inserted as FIG. 11, the dummy cell is mapped to the subframe as FIG. 17, and when the dummy cell is inserted as FIG. 12, the dummy cell may be mapped to the subframe as FIG. 18.

Returning to FIG. 1, the transmission unit 120 transmits the subframe to a reception apparatus (not shown).

For example, the transmission unit 120 may include at least one transmission antenna (not shown), or the like, and transmit a frame including the subframe to a transmission apparatus (not shown) through the channel.

The transmission apparatus 100 may map the L1 signaling including parameters related to the PLP and the subslice to a frame, and transmit the frame to a reception apparatus (not shown).

To be specific, the information on the PLP type, PLP size, starting position, the number of subslices, and interval of subslice may be mapped to the preamble of the frame and transmitted to the reception apparatus (not shown). When the dummy cell is mapped in a random manner, information on the index of cell to which the dummy cell is mapped is mapped to the preamble of the frame and transmitted to the reception apparatus (not shown).

Figure 19:
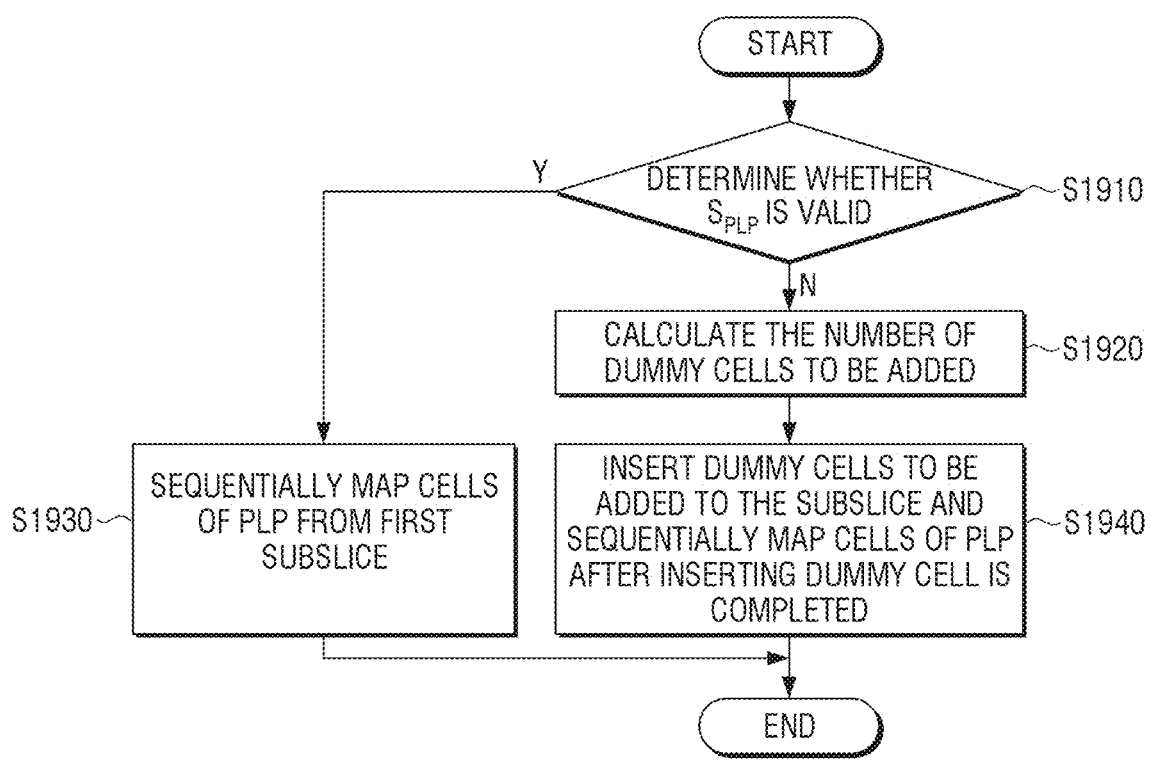
FIG. 19 is a view provided to describe a method for inserting a dummy cell according to an embodiment.

FIG. 19 is a view provided to describe a method for inserting a dummy cell according to an embodiment.

First of all, whether $S_{PLP}$ is a valid value is determined in step S1910. In this case, whether the $S_{PLP}$ is a valid value may be determined according to whether Equation 2 is satisfied.

Here, when the $S_{PLP}$ is a valid value, that is, Equation 2 is satisfied in step S1910-Y, the cells of PLP are sequentially mapped from the first subslice in step S1930.

In the meantime, when $S_{PLP}$ is not a valid value, that is, Equation 2 is not satisfied in step S1510-N, the number of dummy cells to be added is calculated in step S1920. In this case, the number of dummy cells to be added may be calculated based on Equation 3.

The dummy cells may be inserted from the first subslice, and when insertion of the dummy cell is completed, the cells of PLP may be sequentially mapped in step S1940.

In FIG. 19, it has been described that the dummy cells are mapped from the first cell of the first slice, but this is merely exemplary. That is, the dummy cell may be mapped from the last cell of the last subslice, the dummy cell may be mapped to the first cell of the subslice as the calculated number, or the dummy cell may be mapped to the last cell of the subslice as the calculated number.

Figure 20:
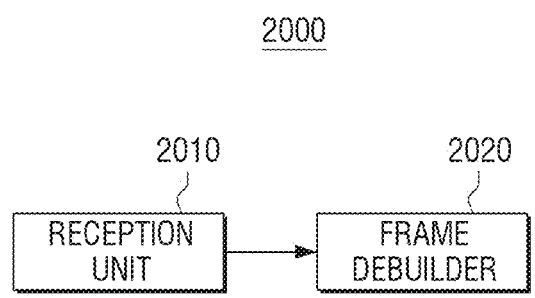
FIG. 20 is a block diagram provided to describe a configuration of a reception apparatus according to an embodiment.

FIG. 20 is a block diagram provided to describe a configuration of a reception apparatus according to an embodiment.

A reception apparatus 2000 may include a synchronization & demodulation module (not shown), a frame parsing module (not shown), a demapping & decoding module (not shown), and an output processor (not shown).

The synchronization & demodulation module (not shown) may receive an input signal through at least one receiving antenna, perform detection and synchronization of a signal for a system corresponding to the reception apparatus 200, and perform demodulation corresponding to the reverse process of the procedure executed in the transmission apparatus 100.

The frame parsing module (not shown) may parse a frame from a received signal, and extract data transmitted a service selected by a user from the frame. At this time, the position of data to be extracted may be provided from the transmission apparatus 100 through L1 signaling.

The demapping and decoding module (not shown) may perform demodulation and decoding for the extracted data.

To be specific, the demapping and decoding module (not shown) may perform demodulation for the modulation applied in the transmission apparatus 100 and correct an error occurring in the transmission channel through decoding. At this time, the transmission parameter required for demodulation and decoding may be provided from the transmission apparatus 100 through L1 signaling.

The output processor (not shown) is a configuration corresponding to an input formatting module (not shown) of the transmission apparatus 100, and may perform a reverse process of various compressions and signal processing procedure applied to the transmission apparatus 100. In this case, the necessary control information may be provided from the transmission apparatus 100 through L1 signaling.

Accordingly, output of the output processor (not shown) may be a plurality of data which is inputted to the transmission apparatus 100.

In the meantime, as described above, the reception apparatus 2000 may extract and process data for transmission of the service selected by the user from the frame. At this time, the reception apparatus 2000 may determine whether there are dummy cells among the cells mapped to the subframe, and process only the cells corresponding to the data except the dummy cells. Hereinafter, this will be described in more detail.

Figure 21:
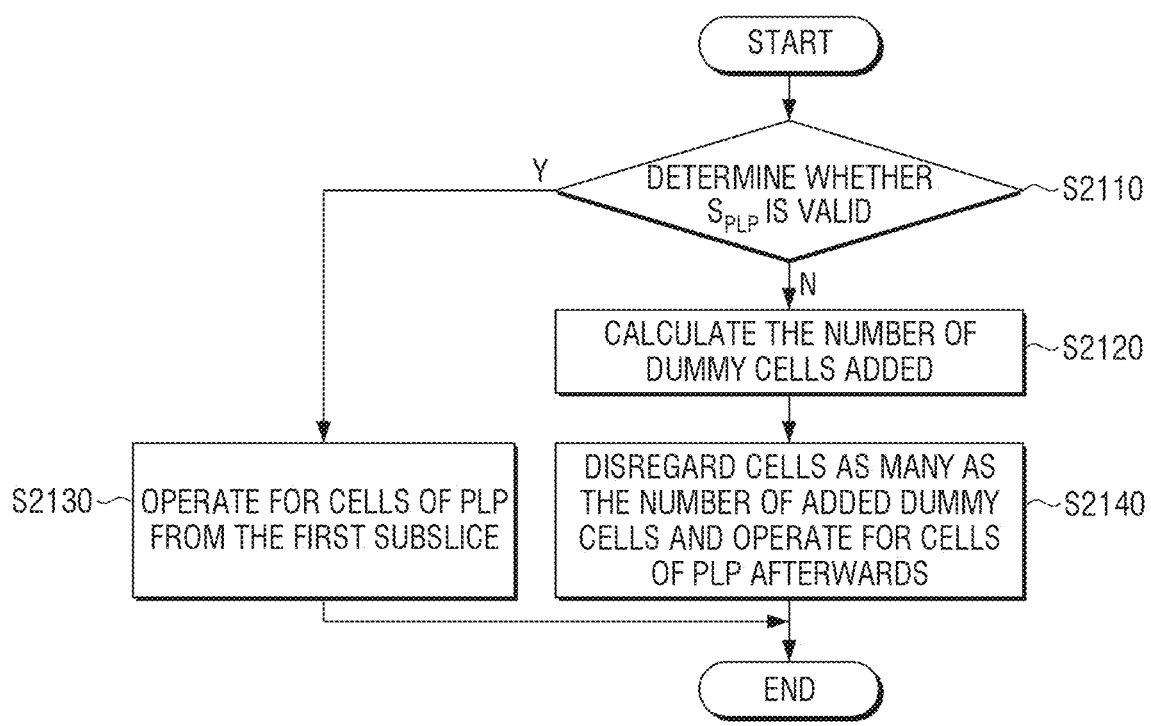
FIG. 21 is a view provided to describe a method for processing a dummy cell according to an embodiment.

For this purpose, the reception apparatus 2000 may include a reception unit 2010 and a frame de-builder 2020 as FIG. 21

The reception unit 2010 receives a subframe transmitted from the transmission apparatus 100.

For example, the reception unit 2010 may receive a frame including a subframe transmitted by the transmission apparatus 100 including at least one receiving antenna (not shown), or the like.

At this time, the frame may include parameters related to the PLP and the subslice. That is, information on PLP type, PLP size, starting position, number of subslices, and interval of subslices may be mapped in the preamble of the frame. In the meantime, when the dummy cells are randomly mapped, the frame may include information on the index of the cell to which the dummy cell is mapped.

The frame de-builder 2020 determines whether a dummy cell is inserted to the subframe.

For this purpose, the frame de-builder 2020 may calculate the size of the subslice, for each PLP, based on the number of cells of the PLP transmitted through one subframe and the number of predetermined subslices. In this case, the frame de-builder 2020 may calculate the size of the subslice based on Equation 1.

The frame de-builder 2020 may compare the value calculated based on the size of the subslice and the number of subslices with the number of cells of the PLP (that is, the size of the PLP) and determine whether the dummy cell is inserted to the subframe.

In this case, the frame de-builder 2020 may determine that a dummy cell is inserted when the value calculated based on the size of the subslice and the number of subslices is equal to or greater than the number of cells of the PLP.

To be specific, the frame de-builder 2020 may determine whether the dummy cell is inserted, based on whether Equation 2 is satisfied.

That is, when Equation 2 is not satisfied, the frame de-builder 2020 may determine that the dummy cell is inserted.

In this case, if it is determined that the dummy cells are inserted, the frame de-builder 2020 may calculate the number of inserted dummy cells. Specifically, the frame de-builder 2020 may calculate the number of the inserted dummy cells based on Equation 3.

In the meantime, when the dummy cell is inserted, the frame de-builder 2020 may de-map the cells of PLP from the subframe, except the dummy cells.

Specifically, the frame de-builder 2020 may determine a cell to which a dummy cell is mapped in a subframe, and de-map the cells of the PLP excluding the dummy cell in the subframe.

For this purpose, the frame de-builder 2020 may determine a starting position where the cells of PLP are mapped in the subframe, based on the calculated number of dummy cells.

The frame de-builder 2020 may determine a cell to which the dummy cell is mapped in the subframe. That is, the frame de-builder 2020 may determine the index of the cell to which the dummy cell is mapped in the subframe.

For example, the frame de-builder 2020 may determine that the dummy cells as many as the number calculated from the first cell of the first subslice of the PLP subslice is sequentially mapped. As another example, the frame de-builder 2020 may determine that the dummy cells as many as the number calculated from the last cell of the last subslice of the PLP subslice is mapped in the reverse order. As still another example, the frame de-builder 2020 may determine that the dummy cells are mapped to the first cells of the subslices as many as the calculated number among the subslices of the PLP. As another example, the frame de-builder 2020 may determine that the dummy cells are mapped to the last cells of the subslices as many as the number calculated in the subslices of the PLP.

The reception apparatus 2000 may receive information on how the transmission apparatus 100 has mapped the dummy cell to the subslice from the transmission apparatus 100, or the information may be prestored in the reception apparatus 2000.

In the meantime, the frame de-builder 2020 may determine the cell to which the dummy cell is mapped in the subframe through another method.

For example, when the transmission apparatus 100 maps the dummy cells in a random manner, the transmission apparatus 100 may transmit information on the index of the cell to which the dummy cell is mapped to the reception apparatus 200. In this case, the frame de-builder 2020 may determine the index of the cell to which the dummy cell is mapped in the subframe based on the information received from the transmission apparatus 100.

Meanwhile, in these cases, the frame de-builder 2020 may determine that the cells of the PLP are mapped sequentially from the first cell among the remaining cells excluding the cell mapped to the dummy cell in the subframe.

When the position of the cells of the PLP is determined, the frame de-builder 2020 may perform demapping of only the cells of the PLP except for the dummy cell from the subframe, and the reception apparatus 2000 may process only the cells of the PLP.

In the meantime, when Equation 2 is satisfied, the frame de-builder 2020 may determine that the dummy cell is not inserted.

In this case, in that the cells of PLP are sequentially mapped from the first cell of the subslice, the frame de-builder 2020 may perform demapping of the cells of the PLP from the subframe, and the reception apparatus 2000 may process the cells of PLP.

FIG. 21 is a view provided to describe a method for processing a dummy cell according to an embodiment.

First of all, whether $S_{PLP}$ is a valid value is determined in step S2110. In this case, whether $S_{PLP}$ is a valid value may be determined according to whether Equation 2 is satisfied.

Here, when the $S_{PLP}$ is a valid value, that is, Equation 2 is satisfied in step S2110-Y, the cell of PLP mapped from the first cell of the first subslice is processed in step S2130.

However, if the $S_{PLP}$ is not a valid value, that is, if the Equation 2 is not satisfied in step S2110-N, the number of added dummy cells is calculated in step S2120. In this case, the number of added dummy cells may be calculated based on Equation 3.

The cells as many as the calculated number from the first subslice may be disregarded, and the cells of PLP mapped to the cells thereafter may be processed in step S2140.

In FIG. 21, it has been described that the dummy cells are mapped from the first cell of the first subslice, but this is merely an example. That is, the number of cells as many as the calculated number may be disregarded from the last cell of the last subslice, the cells mapped to the first cell of the subslice as many as the calculated number may be disregarded, or the cells mapped to the last cell of the subslices as many as the calculated number may be disregarded.

Figure 22:
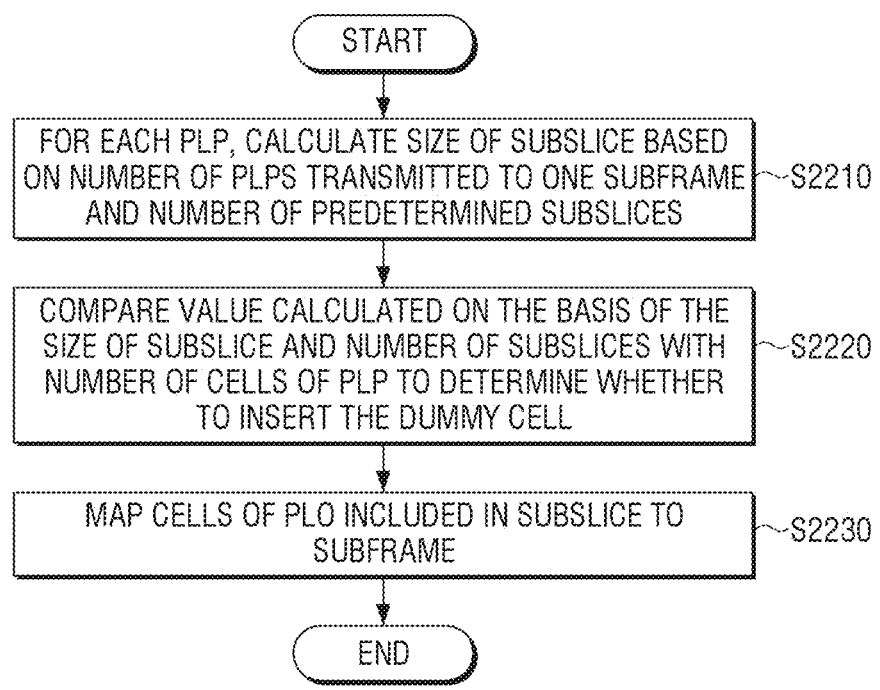
FIG. 22 is a flowchart to describe a method for cell multiplexing according to an embodiment.

FIG. 22 is a flowchart to describe a method for cell multiplexing according to an embodiment.

First, for each PLP, the size of the subslice size is calculated based on the number of cells of the PLP transmitted to one subframe and the number of predetermined subslices in step S2210. In this case, the size of the subslice may be calculated based on Equation 1.

Then, by comparing the value calculated based on the size of subslice and the number of subslice with the number of cells of PLP, whether to insert the dummy cell is determined in step S2220.

The cells of PLP included in the subslice are mapped to the subframe in step S2230. Here, at least one of the subslice may include the dummy cell according to whether the dummy cell is inserted.

In the meantime, in step S2220, when the value calculated based on the size of the subslice and the number of subslices is equal to or greater than the number of cells of the PLP, it may be determined to insert the dummy cell. Specifically, if Equation 2 is not satisfied, it may be determined to insert the dummy cell.

In the meantime, when the value calculated based on the size of the subslice and the number of subslices is smaller than the number of cells of the PLP, it may be determined not to insert the dummy cell. Specifically, when Equation 2 is satisfied, it may be determined not to insert the dummy cell.

In the meantime, if it is determined to insert the dummy cell, the number of dummy cells may be calculated. The number of dummy cells may be calculated based on Equation 3.

In the meantime, the dummy cell may be mapped to the subslice in various ways.

For example, the dummy cell may be mapped from the first cell of the first subslice among the subslices. As another example, the dummy cell may be mapped from the last cell of the last subslice among the subslices. As another example, the dummy cell may be mapped to the first cell of at least one subslice among the subslices. As another example, the dummy cell may be mapped to the last cell of at least one subslice among the subslices.

Meanwhile, in step S2230, the subslice of the first PLP may be mapped to the subframe, and the subslice of the second PLP may be mapped from an index subsequent to the index of the subframe to which the subslice of the first PLP is mapped.

In the meantime, a method of mapping the dummy cell to the subslice by determining whether to insert the dummy cell has been described above.

Figure 23:
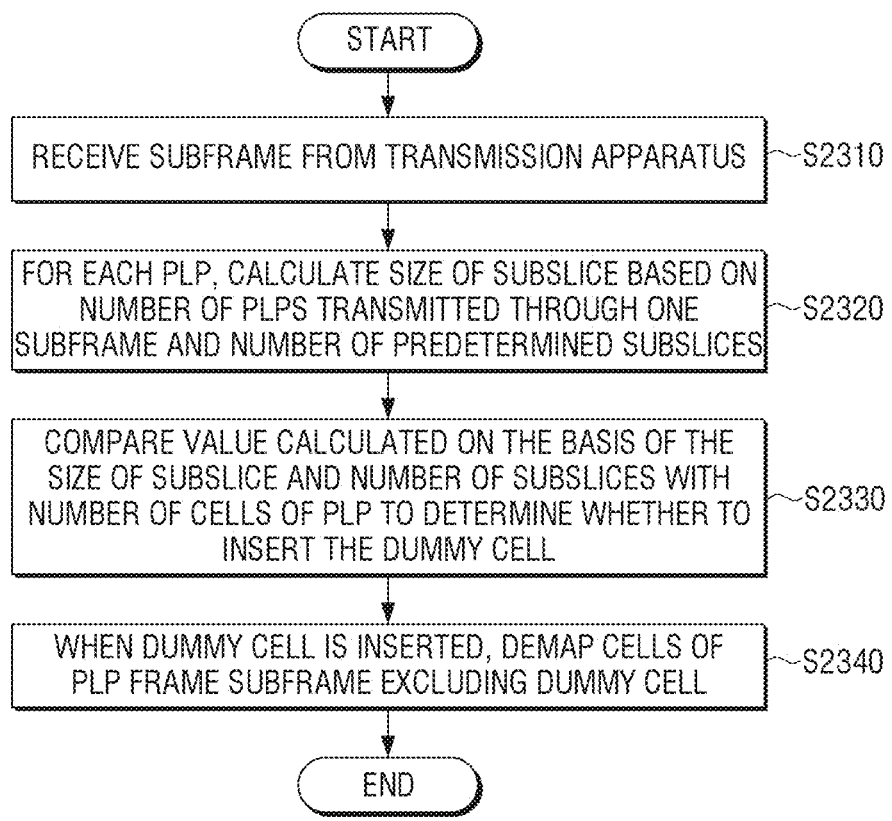
FIG. 23 is a flowchart to describe a method for cell demultiplexing according to an embodiment.

FIG. 23 is a flowchart to describe a method for cell demultiplexing according to an embodiment.

First of all, a subframe is received from the transmission apparatus in step S2310.

Then, for each PLP, the size of the subslice is calculated based on the number of cells of the PLP transmitted through one subframe and the number of predetermined subslices in step S2320. In this case, the size of the subslice may be calculated based on Equation 1.

By comparing the value calculated based on the size of the subslice and the number of subslice with the number of the cells of PLP, whether the dummy cell is inserted in the subframe is determined in step S2330.

In this case, when the value calculated based on the size of the subslice and the number of subslices is equal to or greater than the number of cells of the PLP, it may be determined that the dummy cell is inserted. Specifically, when Equation 2 is not satisfied, it may be determined that the dummy cell is inserted.

When the dummy cell is inserted, the cells of PLP are demapped from the subframe, excluding the dummy cell in step S2340.

In the meantime, if it is determined that the dummy cell is inserted, the number of inserted dummy cell may be calculated. In this case, the number inserted dummy cells may be calculated based on Equation 3.

In the meantime, the cells to which the dummy cell is mapped in the subframe may be determined, and the cells of PLP may be demapped in the subframe, excluding the dummy cell.

In the meantime, a non-transitory computer readable medium in which a program which sequentially executes a cell multiplexing method and a cell demultiplexing method according to an embodiment may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

In addition, in the aforementioned block diagram which illustrates the transmission apparatus and the reception apparatus does not illustrate a bus, but communications between each component in the transmission apparatus and the reception apparatus may be performed through a bus. In addition, each apparatus may further include a processor, such as a central processing unit (CPU), a microprocessor, and the like, which perform various operations described above, and each apparatus may further include a memory for performing the various operations described above.

In addition, the components, modules, units, and the like in the embodiments may be implemented by hardware, firmware, or software for performing at least one function or operation, or a combination thereof. For example, they may have integrated circuit structures, such as memory, processing logic, look-up tables, etc., that may execute each function through control of at least one microprocessor or other control devices. They may also be implemented by a program or code that includes at least one instruction executable to perform a particular logic function. In addition, they may include a CPU for executing each function and a processor such as a microprocessor. In addition, excluding the case where each needs to be implemented as specific individual hardware, they may be integrated as at least one module or chip, and implemented as at least one processor (not shown).

While the embodiment has been particularly shown and described, it is to be understood that the disclosure is not limited to the embodiment as described above, and it will be understood by those skilled in the art that various changes and modifications may be made without departing from the spirit and scope of the disclosure.

The invention claimed is:

1. A transmission apparatus for multiplexing cells of a plurality of physical layer pipes (PLPs), the transmission apparatus comprising:
a frame builder configured to:
for each PLP, based on a number of cells of the PLP to be transmitted in one subframe and a number of predetermined subslices, calculate a size of a subslice from among the subslices, calculate a value based on the size of the subslice and the number of the subslices, determine a number of the cells of the PLP, compare the calculated value with the determined number to determine whether to insert a dummy cell, and map a cell of the PLP included in the subslice to a subframe; and a transmission unit for transmitting the subframe to a reception apparatus, wherein at least one of the subslices comprises the dummy cell depending on whether the dummy cell is inserted.

2. The transmission apparatus of claim 1, wherein the frame builder calculates the size of the subslice based on an equation below $$S_{subslice} = \lceil S_{PLP}/N_{subslices} \rceil,$$

wherein the $S_{subslice}$ is the size of the subslice, the $S_{PLP}$ is the number of the cells of the PLP, and the $N_{subslices}$ is the number of the subslices.

3. The transmission apparatus of claim 1, wherein the frame builder, when the value calculated based on the size of the subslice and the number of the subslices is greater than or equal to the number of the cells of the PLP, determines to insert the dummy cell.

4. The transmission apparatus of claim 1, wherein the frame builder, when an equation below is not satisfied, determines to insert the dummy cell $$\lceil S_{PLP}/N_{subslices} \rceil \times (N_{subslices}-1) < S_{PLP},$$

wherein the $S_{PLP}$ is the number of the PLP, and the $N_{subslices}$ is the number of the subslices.

5. The transmission apparatus of claim 3, wherein the frame builder, when it is determined that the dummy cell is inserted calculates a number of dummy cells to be inserted.

6. The transmission apparatus of claim 5, wherein the frame builder calculates the number of the dummy cells based on an equation below $$N_{dummy} = \lceil S_{PLP}/N_{subslices} \rceil \times N_{subslices} - S_{PLP},$$

wherein the $N_{dummy}$ is the number of the dummy cells, the $S_{PLP}$ is the number of the cells of the PLP, and the $N_{subslices}$ is the number of the subslices.

7. The transmission apparatus of claim 1, wherein the frame builder maps the dummy cell from a first cell of a first subslice from among the subslices.

8. The transmission apparatus of claim 1, wherein the frame builder maps the dummy cell from a last cell of a last subslice, from among the subslices.

9. The transmission apparatus of claim 1, wherein the frame builder maps the dummy cell to a first cell of at least one subslice, from among the subslices.

10. The transmission apparatus of claim 1, wherein the frame builder maps the dummy cell to a last cell of at least one subslice, from among the subslices.

11. The transmission apparatus of claim 1, wherein the frame builder maps a subslice of a first PLP to the subframe, and maps a subslice of a second PLP from an index subsequent to an index of the subframe to which the subslice of the first PLP is mapped.

12. A method for multiplexing of cells of a plurality of physical layer pipes (PLPs), the method comprising:

for each PLP, based on a number of cells of the PLP to be transmitted in one subframe and a number of predetermined subslices, calculating a size of a subslice from among the subslices;

comparing a value calculated based on the size of the subslice and the number of the subslices with a number of the cells of the PLP to determine whether to insert a dummy cell; and mapping a cell of the PLP included in the subslice to a subframe, wherein at least one of the subslices comprises the dummy cell depending on whether the dummy cell is inserted.

13. The method of claim 12, wherein the determining comprises, when an equation below is not satisfied, determining to insert the dummy cell $$\lceil S_{PLP}/N_{subslices} \rceil \times (N_{subslices}-1) < S_{PLP},$$

wherein the $S_{PLP}$ is the number of the PLP, and the $N_{subslices}$ is the number of the subslices.

14. A reception apparatus for demultiplexing cells of a plurality of PLPs, the apparatus comprising:

a reception unit for receiving a subframe from a transmission apparatus; and a frame de-builder configured to:

for each PLP, based on a number of cells of the PLP to be transmitted through one subframe and a number of a predetermined subslices, calculate a size of a subslice from among the subslices, calculate a value based on the size of the subslice and the number of the subslices, determine a number of the cells of the PLP, compare the calculated value with the determined number to determine whether a dummy cell is inserted in the subframe, and based on the dummy cell being inserted, de-map the cells of the PLP from the subframe excluding the dummy cell.

15. The reception apparatus of claim 14, wherein the frame de-builder calculates the size of the subslice based on an equation below:

$$S_{subslice} = \lceil S_{PLP}/N_{subslices} \rceil,$$

wherein the $S_{subslice}$ is the size of the subslice, the $S_{PLP}$ is the number of the cells of the PLP, and the $N_{subslices}$ is the number of the subslices.

* * * * *